March 18, 1969 G. J. DE VRIES, JR 3,433,889
RECIPROCATING ELECTRIC CONNECTING SYSTEM
Filed June 30, 1966 Sheet 1 of 4
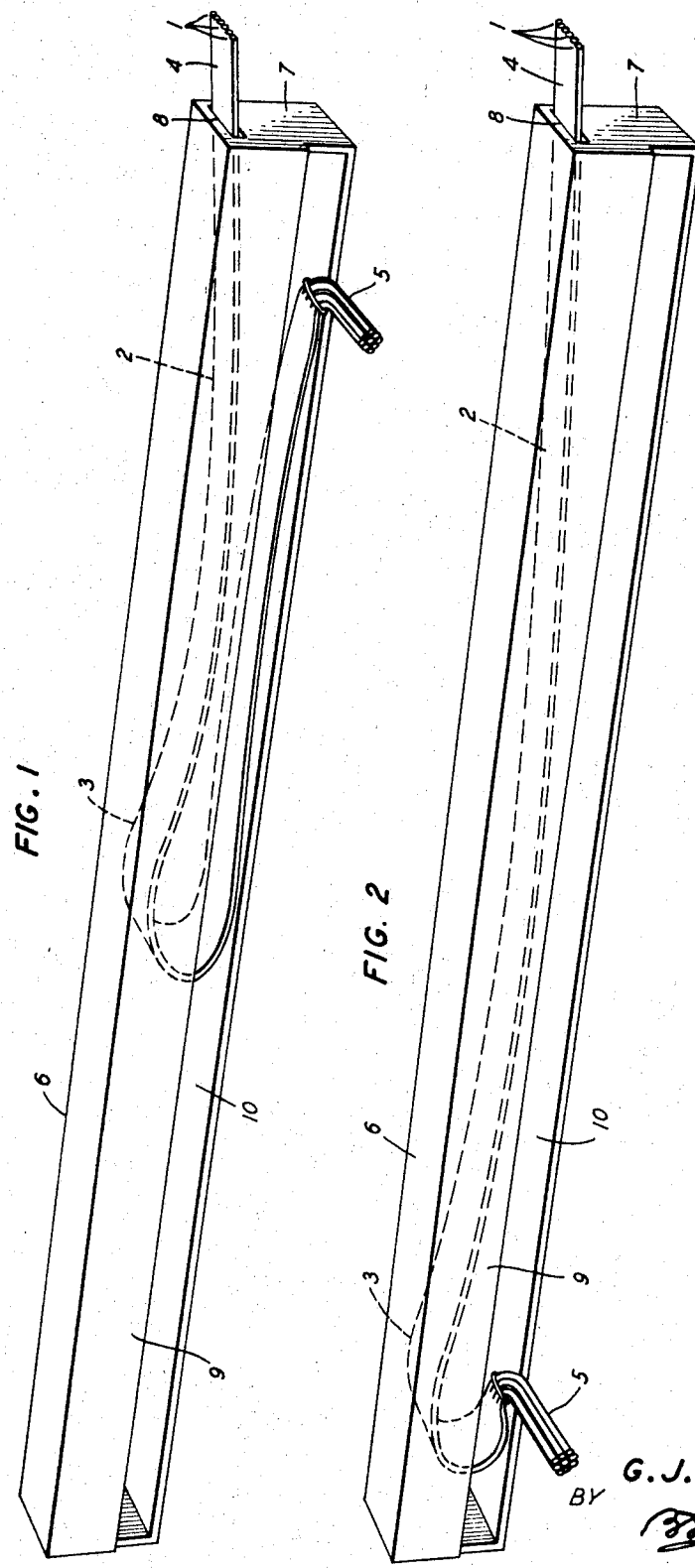
INVENTOR
G. J. DE VRIES, JR.
BY
Stoddard
ATTORNEY

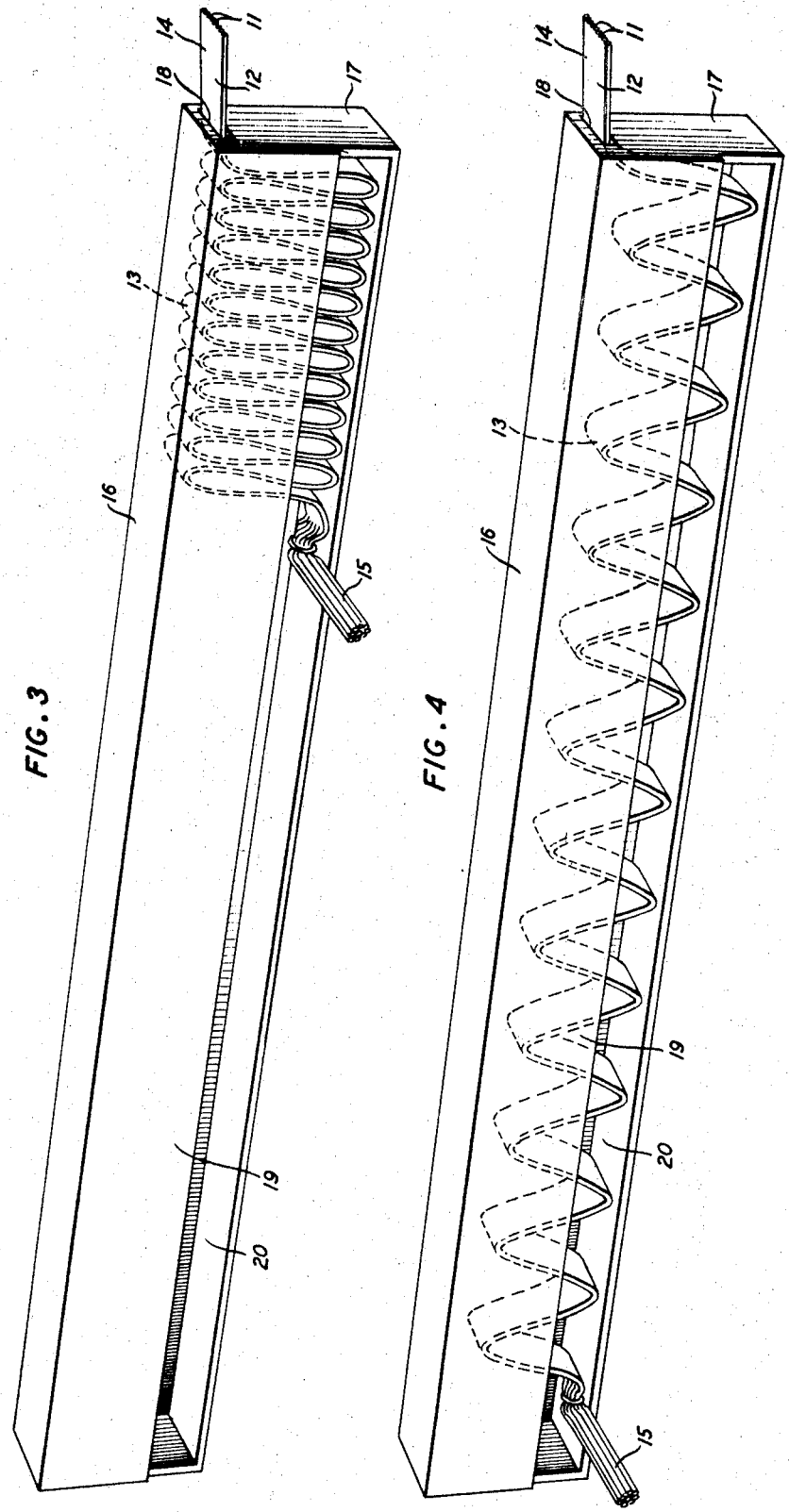

United States Patent Office 3,433,889
Patented Mar. 18, 1969

3,433,889
RECIPROCATING ELECTRIC CONNECTING SYSTEM
G. John DeVries, Jr., Dover, N.J., assignor to Bell Telephone Laboratories, Incorporated, Murray Hill, N.J., a corporation of New York
Filed June 30, 1966, Ser. No. 561,979
U.S. Cl. 174—69                              1 Claim
Int. Cl. H01b 7/06; H05k 5/04

ABSTRACT OF THE DISCLOSURE

A system of electric connection between a stationary member and a reciprocating member adapted to move back and forth along a path of travel in a horizontal plane. The system comprises a receptacle having a length slightly greater than the length of said path of travel. The receptacle is fastened to the stationary member with its longitudinal axis lying in a plane parallel to said horizontal plane. One slot is formed in an end of the receptacle and another slot is formed along one side of the receptacle. A flexible electric cable is folded upon itself and is placed inside the receptacle. One end of the cable projects through the end slot and is attached to the stationary member. The other end of the cable protrudes through the side slot and is secured to the reciprocating member for movement therewith so that it slides back and forth along the length of the side slot thereby alternately unfolding and folding that portion of the cable which is in the receptacle.

---

This invention relates to a reciprocating system of electric connection and, more particularly, to a system of electric connection between a stationary member a and movable member adapted to slide back and forth along a fixed path of travel.

There are various types of equipment that require the connection of one or more electric conductors between two elements which are subject to relative reciprocating motion. One such example is a telephone handset positioned in a drawer of a desk so as to move back and forth with respect to its associated junction box which is fixedly attached in a suitable location, such as to a panel of the desk. The installation of a telephone of this type requires that the movable handset be connected to the stationary junction box by an electric cable that is capable of following the reciprocating motion of the handset. An additional requirement is that the cable must be designed to move within the limited space between the drawer and the panel of the desk. This movement of the cable should be effected without producing any substantial degree of frictional wear on the cable and without interfering with the movement of other drawers in the desk. Other types of equipment, to which this invention may be applied, require that the electric connecting system impart no appreciable mechanical bias or restraint to the particular reciprocating member employed therein.

Accordingly, it is an object of this invention to provide an improved reciprocating electric connector.

Another object of this invention is to provide an improved system of electric connection between a stationary member and a reciprocating member.

A further object of the invention is to provide an improved system of electric connection between a stationary member and a reciprocating member without imposing any substantial mechanical bias or restraint upon the reciprocating member.

These and other objects of the invention are attained by employing a flexible electric conductor having an intermediate portion folded upon itself with an unfolded portion at each end thereof. In one embodiment of the invention, the conductor is folded upon itself in a U-shape, and in another embodiment it is folded upon itself in an accordion shape. The folded conductor is enclosed within a container having a length which is at least slightly greater than the length of the path of travel of the desired reciprocating motion. The container is fixedly secured to some object, such as to the interior surface of a desk panel, and is so disposed that its longitudinal axis is parallel to the path of travel of the desired reciprocating motion. One end of the container is provided with an opening, and one side of the container has a slot formed therein which has a length at least equal to the aforesaid path of travel.

The electric conductor is enclosed within the container in such a manner that one of its unfolded portions projects through the end opening of the container and is attached to a stationary member, such as a telephone junction box. The other end of the electric conductor protrudes through the side slot of the container and is fastened to a reciprocating member, such as a telephone handset positioned in a drawer of a desk. Thus, when the desk drawer containing the telephone is moved in and out, the associated end of the electric conductor will follow its motion and will slide back and forth along the length of the side slot thereby alternately unfolding and folding the intermediate portion of the electric conductor which is enclosed within the container.

These and other features of the invention are more fully discussed in connection with the following detailed description of the drawing in which:

FIG. 1 is a perspective view of the above-mentioned container with an electric cable enclosed therein and folded upon itself in a U-shape;

FIG. 2 is a similar view of the container but with the enclosed electric cable shown in an extended position;

FIG. 3 is a perspective view of a somewhat larger container which encloses an electric cable that is folded upon itself in an accordion shape;

FIG. 4 is a similar view of the second-mentioned container showing the enclosed electric cable in an extended position;

Figure 5:
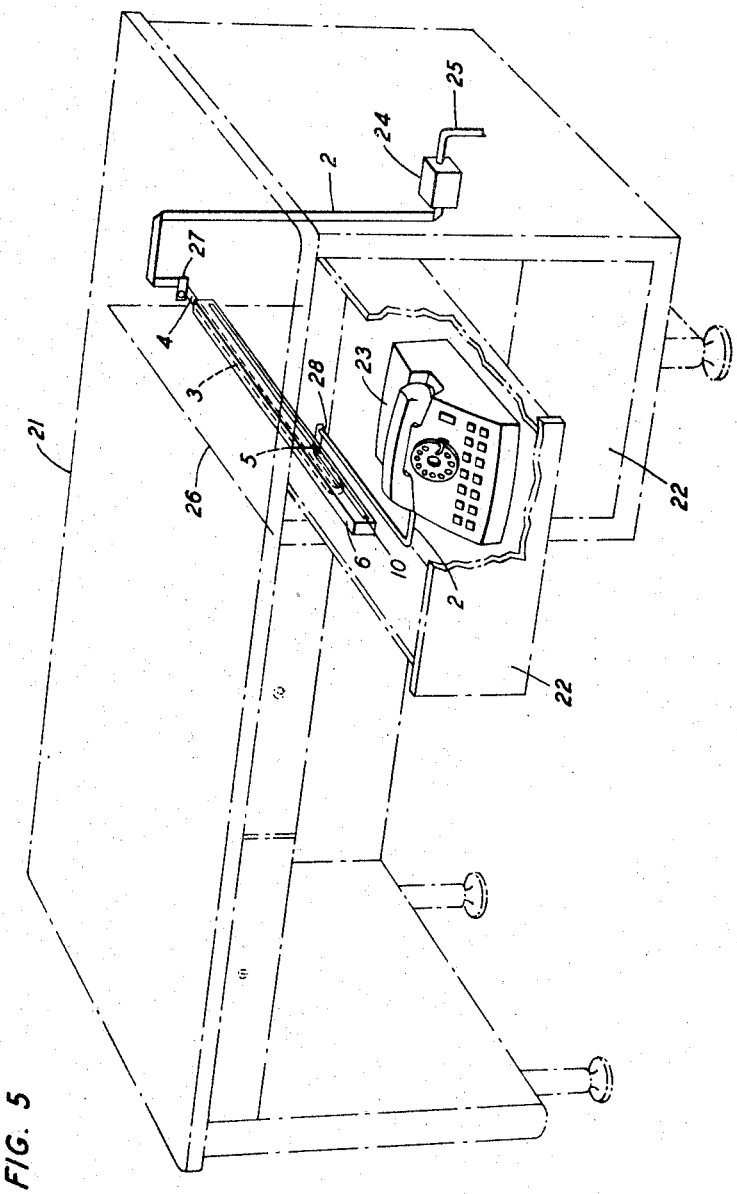
FIG. 5 is a perspective view of the system of electric connection of this invention applied to a telephone handset mounted in the drawer of a desk which is shown in phantom.

In the exemplary embodiment of the invention that is shown in FIG. 1, the system of electric connection is represented as including a plurality of thin electrically conductive wires 1 that are individually insulated. The wires 1 are bonded together, side by side, by means of a suitable flexible material having a low coefficient of friction, such as Teflon, so as to form a flat cable ribbon or band 2. An intermediate portion of this cable 2 is folded upon itself in a U-shape, as indicated by the reference numeral 3, with upper and lower unfolded portions 4 and 5, respectively, on each end thereof.

The folded intermediate portion 3 of the cable 2 is enclosed within a container 6 which is made of any suitable material. This container 6 has a length which is at least slightly greater than the length of the path of travel of the desired reciprocating motion. The interior width of the container 6 is at least just slightly more than the width of the flat cable ribbon 2, and the interior height is sufficient to accommodate the fold 3 in the cable 2 so that it can flex easily. Thus, the container 6 is of minimum size so that it can readily fit into a limited space, such as between the side of a desk drawer and the adjacent panel of the desk.

One end 7 of the container 6 has an opening 8 formed therein. The opening 8 has a length at least just slightly greater than the width of the ribbon cable 2. The height or width of the opening 8 is at least slightly more than the thickness of the flat cable 2. Accordingly, the dimensions of the opening 8 are such as to permit the upper unfolded end portion 4 of the cable 2 to project through this end opening 8 so that it can be fastened to a stationary member, such as a telephone junction box that is fixedly attached to a desk.

The front side 9 of the container 6 is provided with a slot 10 having a length at least equal to the above-mentioned path of travel. The height of the slot 10 is at least a little more than the thickness of the flat cable 2 but is substantially less than the height of the U-shaped fold 3. Thus, the front side 9 serves to keep the U-shaped fold 3 within the container 6 during the reciprocating motion of the cable 2. It should be noted that the lower unfolded end portion 5 of the cable 2 is bent in such a manner as to protrude through this side slot 10 so that it can be attached to a reciprocating member for movement therewith.

Assuming that the end portion 5 of the cable 2 is fastened to a movable member that is adapted to slide back and forth along a path of travel in a horizontal plane, such as a telephone handset mounted in the drawer of a desk, then FIG. 1 represents the retracted position of the cable 2 at one limit of the reciprocating motion. Similarly, FIG. 2 illustrates the extended position of the cable 2 at the other limit of the reciprocating motion.

In FIG. 2, it can be seen that the lower unfolded end 5 of the cable 2 has moved in a sliding motion along the side slot 10 to the left end thereof. It can also be seen that this movement has caused most of the intermediate portion of the cable 2 to become unfolded. However, it should be noted that a short U-shaped folded portion 3 of the cable 2 is at the left end of the container 6. This is necessary so as to enable the cable 2 to double back upon itself when the movable end portion 5 returns to its initial position at the right end of the container 6, as is shown in FIG. 1.

Thus, during the reciprocating motion of the movable end 5 of the cable 2, the base or vertical portion of the U-shaped cable fold 3 moves back and forth within the container 6 thereby lengthening one of the legs of the U-fold while shortening the other leg. Due to the construction of the cable 2, the amount of force required to flex the folded section 3 is negligible.

Another exemplary embodiment of the invention is shown in FIG. 3 wherein it can be seen that a plurality of electrically conductive wires 11 are fastened together to form a flexible cable ribbon 12. The cable 12 has an intermediate portion 13 folded upon itself in an accordion shape with unfolded portions 14 and 15 at each end thereof.

This intermediate portion 13 of the cable 12 is enclosed within a container 16 that is essentially similar to the other container 6. However, the container 16 is higher than the container 6 so that it can accommodate the cable folds without unduly constraining them. Also, the container 16 is made longer than the container 6 in order to provide storage space at its right end for the folded cable portion 13 when it is in its retracted condition as is shown in FIG. 3.

As is the case with the container 6, the container 16 has an opening 18 formed in its right end 17. The dimensions of this opening 18 are similar to those described above for the opening 8 and are such as to enable the unfolded end portion 14 of the cable 12 to project outwardly so that it can be secured to a stationary member.

The front side 19 of the container 16 is provided with a slot 20 which is similar to the slot 10 of the container 6 in that it has a length at least equal to the above-mentioned path of travel. Unlike the slot 10 the slot 20 need not extend quite so far toward the right end portion of its container 16 because of the storage space required for the folds in the cable 12. The height of the slot 20 is the same as that of the slot 10 so as to enable the unfolded end portion 15 of the cable 12 to protrude therefrom for attachment to a reciprocating member.

When the cable 12 has its end portion 15 attached to a reciprocating member, it will follow the reciprocating member back and forth along a path of travel defined by the slot 20 with the accordion plaits of the intermediate cable section 13 alternately moving from their compressed, or retracted, position shown in FIG. 3 to their extended position shown in FIG. 4. During this movement, the accordion plaits of the folded cable section 13 are confined within the container 16 by means of its front side panel 19 as is indicated in FIG. 4. Also, due to the construction of the cable 2, no appreciable degree of force is required to flex the folded section 13.

As was stated above, the reciprocating electric connecting system of this invention is particularly useful when it is employed for making an electric connection between a fixedly located telephone junction box and a telephone handset mounted in a drawer of a desk. Accordingly, the application of the invention to this type of use is illustrated in FIG. 5 wherein a desk 21 is shown in phantom and is represented as being equipped with a plurality of drawers 22. In one of the drawers 22, a telephone handset 23 is mounted for movement therewith so that it can slide back and forth along a path of travel in a horizontal plane. Associated with the telephone 23 is a junction box 24 having a telephone supply cable 25 connected thereto. The junction box 24 is fixedly mounted in a suitable location, such as on the interior surface of one of the panels 26 of the desk 21.

One of the containers of this invention, such as the container 6 is also fixedly secured to the interior surface of one of the panels 26 and is so disposed that its longitudinal axis is parallel to the reciprocating path of travel of the particular desk drawer 22 that contains the telephone handset 23. One of the folded electric conductors of this invention, such as the U-shaped cable 3, is enclosed within the container 6 in the manner described above. An unfolded portion 4 of the cable 2 that projects through the end opening 8 of the container 6 is fixedly secured to the panel 26 by any suitable means, such as a clamp 27. The cable 2 is then carried down along the interior surface of one of the panels 26 of the desk 21 and is fastened to the stationary junction box 24. The other unfolded portion 5 of the cable 2 is inserted through an opening 28 in the rear of the drawer 22 and is carried along inside the drawer 22 to the telephone handset 23 to which it is attached.

Thus, when the drawer 22 is pulled open to provide access to the telephone handset 23, the unfolded cable portion 5 will follow the movement of the drawer 22 by sliding along the associated side slot 10 in the container 6. This action causes the folded intermediate portion 3 of the cable 2 to move, in the manner described above, to its position shown in FIG. 2. Similarly, when the drawer 22 is pushed in to its closed position, the cable portion 5 will slide back along the side slot 10 thereby causing the intermediate cable portion 3 to return to its initial position shown in FIG. 1. Thus, the intermediate cable portion 3 alternately increases and decreases the extent of its folded area thereby changing or adjusting the effective length of the system of connection. This motion of the cable portion 5 will not interfere with the movement of other drawers in the desk 21. Also it should be noted that this system of electric connection can readily be installed within the limited space between the drawer 22 and the associated panel 26 of the desk 21.

Figure 6:
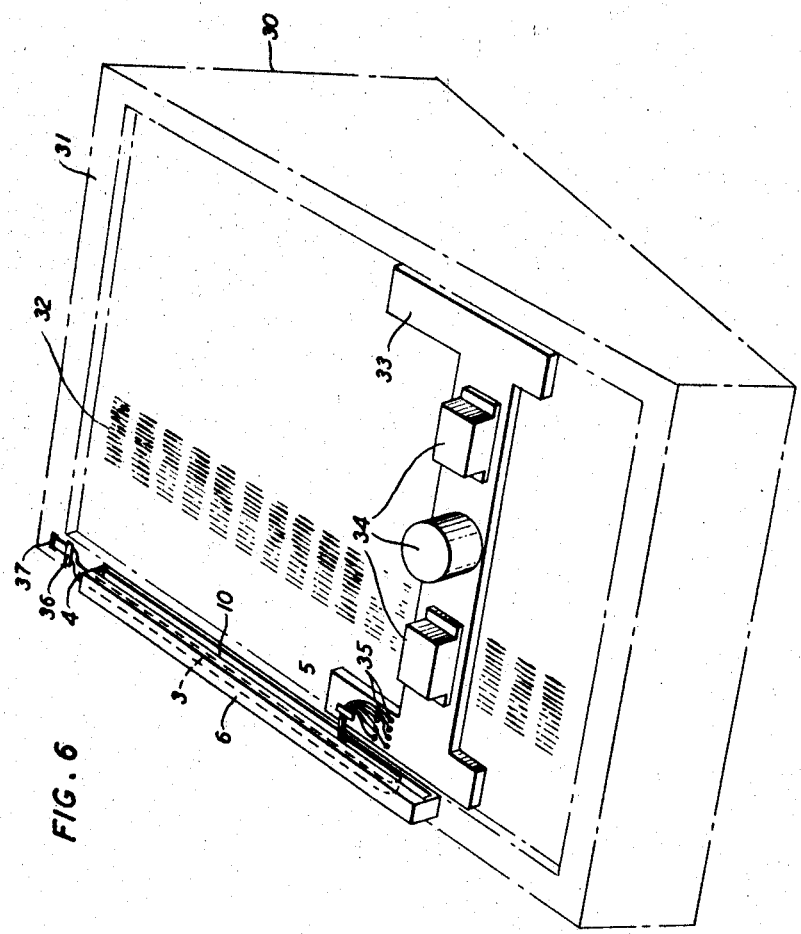
FIG. 6 is a perspective view of the system of electric connection of this invention applied to a reciprocating arm of data examining and analyzing equipment which is shown in phantom.

The electric connection system of this invention can also be applied to other types of reciprocating equipment. For example, it can be applied to equipment for examining and analyzing information recorded on a data chart, such as the equipment shown in FIG. 6. In FIG. 6, a data examining and analyzing machine 30 is shown in phantom and is represented as having a frame 31 on its upper surface for enclosing a data chart 32. The frame 31 also functions as a guide for an examining arm 33 having mounted thereon electric equipment 34 which forms no part of the present invention. This equipment 34 is electrically connected to suitable terminals 35 mounted along the left side of the arm 33. The arm 33 is adapted to move back and forth over the data chart 32 with its reciprocating motion guided and restricted by the frame 31.

One of the containers of this invention, such as the container 6, is fixedly attached to the upper surface of one of the side members of the frame 31 and is so aligned that its longitudinal axis is parallel to the path of travel of the reciprocating arm 31. It should be noted that the container 6 adds very little extra bulk to the machine 30 and does not interfere with movement of the arm 33 nor does it block observation of the data chart 32. One of the folded electric conductors of this invention, such as the U-shaped section 3, is enclosed within the container 6. An unfolded cable end 4 of the cable 2 that projects through the end opening 8 of the container 6 is fixedly attached to the frame 31 by any suitable means, such as a clamp 36. The cable 2 is then passed through an opening 37 in the frame 31 and is connected to suitable utilization circuits which are not a part of this invention. The other unfolded cable end 5 is connected to the terminals 35 and thence to the electric equipment 34 on the arm 33.

Thus, when the arm 33 is moved back and forth over the data chart 32 it carries with it the cable end 5 which, in turn, causes the folded cable portion 3 to change its position in the manner described above. It should be noted that, since the cable end 5 is relatively short, it imposes no appreciable weight or drag on the arm 33 and, therefore, does not impede the reciprocating motion of the arm 33. In other words the electric connection system of this invention does not impart any substantial mechanical bias or restraint to any reciprocating member to which it may be connected.

What is claimed is:
1. A reciprocating electric connecting system for establishing an electric connection between a stationary member and a reciprocating member adapted to move back and forth along a fixed path of travel,
said system comprising a container having a length at least equal to the length of said fixed path of travel,
said container being fixedly mounted with its longitudinal axis along one side of said fixed path of travel and parallel thereto,
means defining a slot in one side of said container,
said side and said slot being adjacent to said fixed path of travel,
said slot having a length at least equal to the length of said fixed path of travel,
means defining an opening in said container near one end of said slot,
a flat flexible electric conductor having an intermediate portion folded upon itself and enclosed within said container,
said conductor having a first end portion projecting through said opening in said container,
means for fixedly securing said first end portion of said conductor to said stationary member,
means for alternately unfolding and folding said intermediate portion of said conductor in accordance with movement of said reciprocating member back and forth along said fixed path of travel,
said last-mentioned means including a second end portion of said conductor bent at an angle to the longitudinal axis of said container and protruding laterally therefrom through said slot normally in a position at said end of said slot that is near said first end portion of said conductor,
and means for attaching said second end portion of said conductor to said reciprocating member for movement therewith back and forth along said fixed path of travel whereby said protruding bent portion of said conductor moves back and forth in said slot.

References Cited

UNITED STATES PATENTS 3,300,572    1/1967    Dahlgren et al.         174—69

FOREIGN PATENTS 1,360,788    4/1963    France.
858,869    1/1961    Great Britain.

DARRELL L. CLAY, Primary Examiner.

U.S. Cl. X.R.

191—12; 312—273; 248—323